March 1, 1966    A. V. HAEFF    3,237,451
VOLUMETRIC MEASUREMENT SYSTEM
Filed Oct. 16, 1962    3 Sheets-Sheet 1

ANDREW V. HAEFF
INVENTOR.

BY
ATTORNEYS

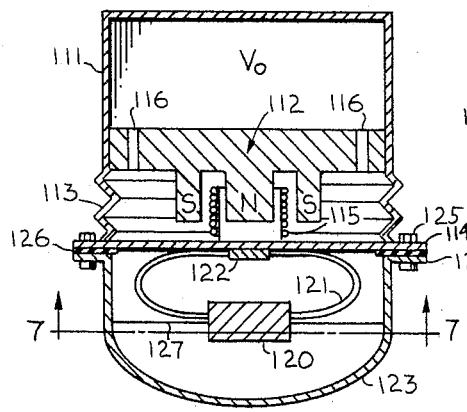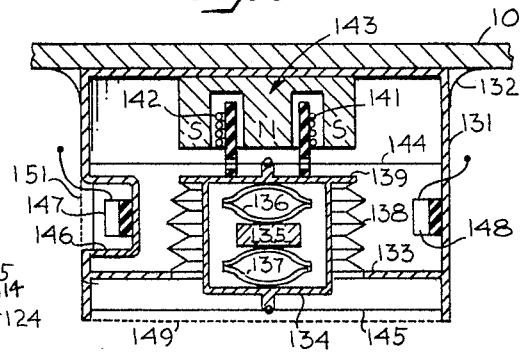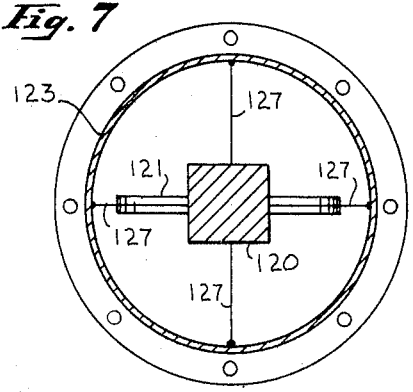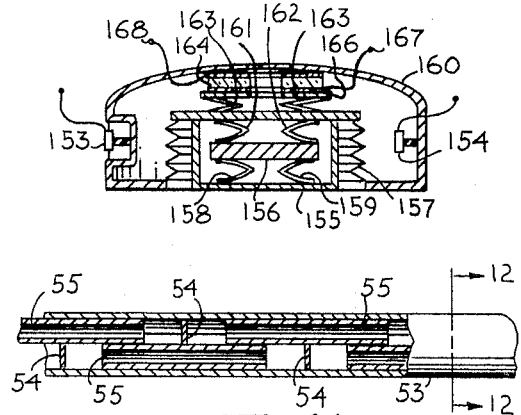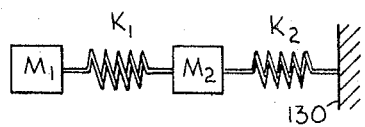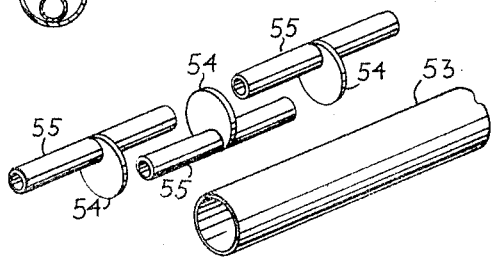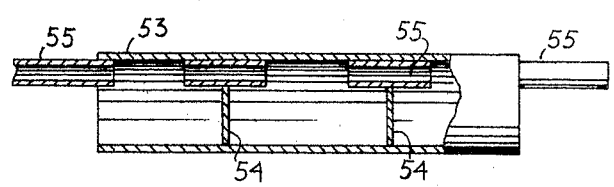

United States Patent Office 3,237,451
Patented Mar. 1, 1966

3,237,451
VOLUMETRIC MEASUREMENT SYSTEM
Andrew V. Haeff, Los Angeles, Calif., assignor to Acoustica Associates, Inc., a corporation of New York
Filed Oct. 16, 1962, Ser. No. 230,866
15 Claims. (Cl. 73—149)

This invention relates to a system for measuring the volume of material within a storage space, and more particularly to a new and improved acoustical system for volumetric measurement.

In measuring the amount of liquid stored within a chamber, such as a tank, one general method is to sense the position of the surface of the liquid. Liquid level sensors may take a number of different forms, as for example, floats or depth gauges. In addition, certain acoustical devices have been employed in the past for this purpose. For example, an acoustical signal can be reflected by the surface of a liquid in a tank from a sending transducer to a receiving transducer. By measuring the time of transit of the acoustical signal, an accurate indication of the position of the surface from the two fixed transducers may be determined. The level thereby determined then need only be related to the geometry of the filled portion of the tank to determine the stored volume.

Where a measurement is based upon the position of a liquid surface, a careful calibration is first made to ascertain the exact relation betwen level and volume. Even with accurate calibration, however, serious deviations from true volume can result from certain unknown factors, such as a meniscus effect resulting in convex or concave surfaces. The degree of surface curvature caused by surface tension or capillary action can be quite large where certain liquids are involved or where the diameter of the storage tank is relatively narrow at the surface level. Accuracy under these conditions depends to a great extent upon where the surface level is measured, since the surface level at the container walls will be higher or lower than at the center.

Where the material stored is a solid, determinations of volume based upon the level within the storage tank are, at best, only close approximations. Even a fine granular solid substance does not form a smooth surface or predictable surface configuration.

In many instances the problems of volume determination caused by surface irregularity and container shape can be avoided by employing another general volume measurement method wherein the weight of the material stored is ascertained and related to its specific weight to obtain volume. The accuracy of this method depends upon the accuracy of the value used for the specific weight which may differ considerably with separate batches of a given material and with changes of temperature. Furthermore, where lage storage capacities are involved, weighing the entire container and its contents may be impractical.

Both of the prior general volume measurement methods require that the material and the storage facility be maintained under fairly static conditons. Violent accelerations do not allow a static level to be established nor can a proper weighing be carried out under transient conditions. Accelerational differences encountered where the storage device is contained within a moving vehicle, especially high speed aircraft and missiles, make volume measurements by the above described methods even more difficult, if not impossible.

The problem of volumetric measurement is particularly acute in accurately measuring the quantities of liquid fuel or oxidizer in space vehicles, especially in a zero-gravity environment due to an irregular and changing shape of the volume occupied by the liquid. Pockets of liquid and gas may be interspersed throughout the storage chamber, thus preventing accurate measurement of stored material by the methods described above.

Under a true zero-gravity and zero-acceleration condition, the gas-liquid interface is determined partly by surface tension effects, but can be controlled to some extent by employing external gas pressure or acoustic pressure. In general, however, the geometry of the liquid body is very complex and the problem of volumetric measurements becomes that of determining the volume of very irregular and indefinite shapes due to various possible metastable states of the liquid-gas interface.

In principle, a simple pressure measuring device can be used to find the magnitude of a volume of any shape. By providing a fixed volume of gas within the container, the pressure in the gas-filled portion can be measured to determine volume. The pressure is inversely proportional to the gas volume for a constant quantity of gas at constant temperature. Therefore, the pressure measurement determines the gas volume of the container, and the liquid volume can then be determined where the total tank volume is known. However, since the gas quantity and the temperature are not constant, the method becomes impractical or very inaccurate.

It is therefore an object of the present invention to provide a system for making volumetric measurements within a storage container under a large variety of external conditions.

It is a further object of the invention to provide an acoustical system for measuring the volume of a liquid under zero-gravity conditions.

Another object of this invention is to provide an acoustical system for measuring the volume of a stored material, the system being relatively free from inaccuracies produced by vibratory conditions or noise.

A still further object of this invention is to provide an accurate system for measuring the volume of a liquid contained within an irregularly shaped container.

Still another object of this invention is to provide a volumetric measuring arrangement for accurately determining the volume of an enclosed liquid having an irregular and indefinite shape at the liquid-gas interface.

Yet another object of this invention is to provide an acoustic pressure method of determining the volume of a material within a container where the gas quantity and temperature are variable.

An additonal object of this invention is to provide an improved drive transducer having stabilized mechanical frequency characteristics which are of particular utility in the volumetric measuring arrangements of this invention.

Yet a further object of this invention is to provide an improved acoustical filter arrangement for use in equalizing pressures between the two spaces while maintaining one of the spaces acoustically isolated and free of fluid.

Various other objects and advantages will be apparent from the following description of the several embodiments of the invention, the novel features of which will be particularly pointed out hereinafter in connection with the appended claims.

In accordance with one aspect of the invention a simple, inexpensive and accurate system is provided for determining the volume of material stored within an acoustically closed storage space. A reference cavity is provided adjacent or even within the closed storage space and a pair of pressure sensitive transducers are placed to sense pressure changes, one within the cavity and the other within the tank or like container serving as the storage space. A drive transducer separates the cavity from the remainder of the tank. When the drive transducer is actuated, a momentary incremental change in volume in both the cavity and the tank takes place with the volume change for the two being equal but opposite. The two different pressure changes which result in the cavity and in the tank are then measured and compared to determine the gas volume and thus the liquid volume, since the total tank volume is known. For simplicity of comparison, a small aperture may be provided between the cavity and the tank to insure that both the composition and the static pressure of the gas within the cavity are the same as within the tank.

In accordance with another aspect of the invention, circuitry is provided to compare the outputs of the pressure sensitive transducers. The comparison circuitry may provide a voltage output directly proportional to the volume of liquid within the tank. A servo mechanism may also be arranged to receive signals from the transducers to indicate the volume of the liquid stored. Where adverse vibrations and noise effects may impair the accuracy of the volume measurements, there may be provided various mechanical and electrical interconnections between the transducers to minimize the adverse effects.

Also in accordance with other aspects of the invention drive transducers are provided having mechanical frequencies stabilizing arrangements. These drive transducers retain a predetermined resonant mechanical frequency even though changes in pressure of the gas occur within the reference cavity. This invention also provides acoustical filters of improved construction for use in equalizing the pressure between the reference cavity and the storage space and maintaining acoustical isolation.

A better understanding of the invention may be had upon a reading of the following detailed description and an inspection of the drawings, in which:

FIG. 6 is a diagrammatic illustration, in section, of one form of a drive transducer with particular frequency characteristics for use in the embodiments of FIG. 1, 2, 4 and 5;

FIG. 7 is a sectional view of a drive transducer according to FIG. 6 taken along line 7—7;

FIG. 8 is a schematic diagram of a mechanical equivalent of the drive transducer of FIGS. 6 and 7;

FIG. 9 is a diagrammatic illustration, in section, of another form of a drive transducer with stable mechanical frequency characteristics for use in the embodiments of FIGS. 1, 2, 4 and 5;

FIG. 10 is another diagrammatic illustration, in section, of yet another form of a drive transducer with the desired frequency characteristics;

FIG. 11 illustrates one form, partially in section, of a pressure connecting tube which acts as an acoustic filter for use with the present invention;

FIG. 12 is a sectional view of the acoustic filter connecting tube of FIG. 11 taken along line 12—12;

FIG. 13 is a perspective view of a partially assembled condition of the acoustic filter of FIGS. 11 and 12 constructed for use as a connecting tube; and FIG. 14 illustrates another form of a pressure connecting tubing, partially in section, having acoustical filtering properties.

Figure 1:
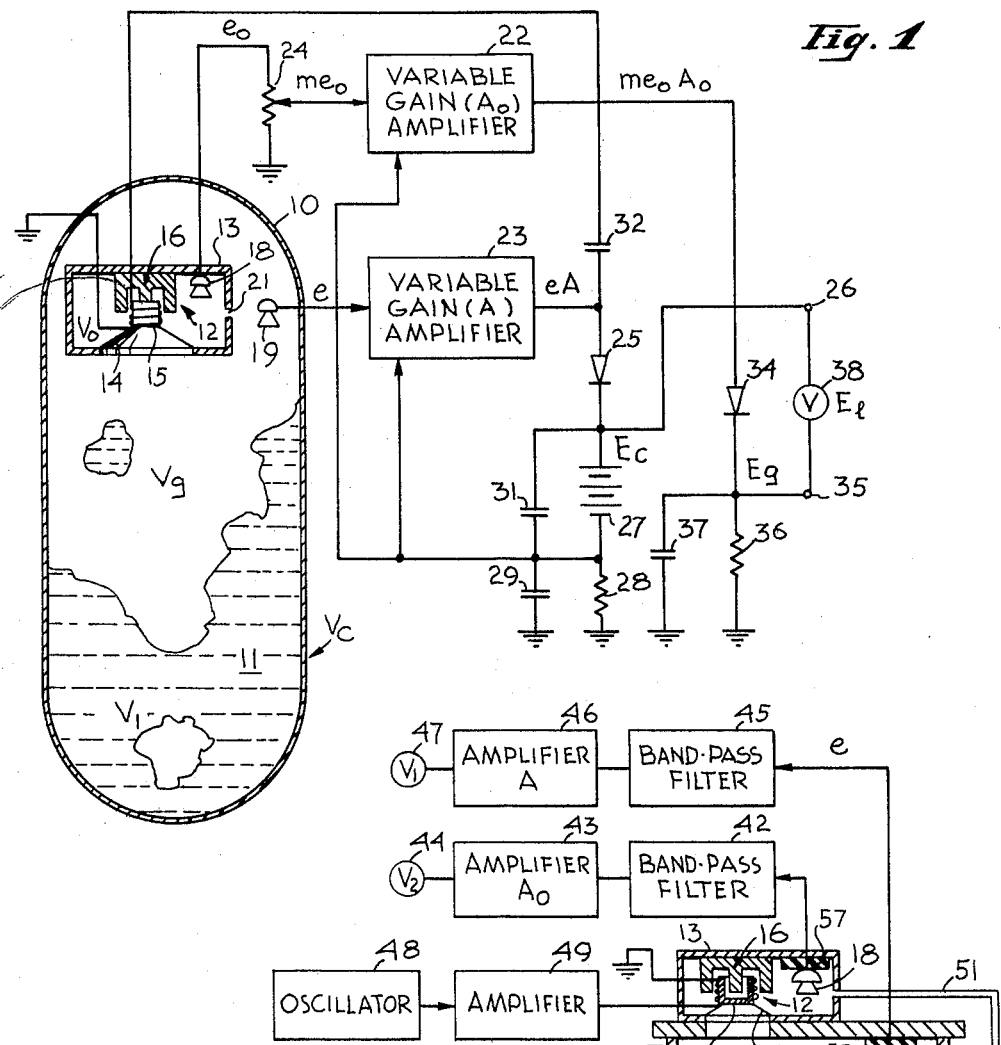
FIG. 1 is a diagrammatic illustration, partially in section, of a preferred embodiment of the invention including a schematic diagram of the electrical circuitry.

Referring now to FIG. 1, a storage container 10 is provided for containing a volume of liquid 11. The container 10 has a total volume $V_c$ encompassing the volume of liquid stored, $V_l$, and a volume of gas $V_g$. Also located within the container and held in place by a suitable mounting (not shown) is an enclosure 13 defining a reference cavity and supporting a drive transducer 12 in the form of an acoustic speaker which may comprise a conventional low frequency loud speaker having a flexible diaphragm 14. The enclosure 13 with the flexible diaphragm 14 of the transducer 12 forms a reference cavity of fixed volume $V_0$. A conventional voice coil 15 is attached to the base of the flexible diaphragm 14 and located adjacent to one end of a magnetic field source 16 in conventional fashion so that a flow of current through the coil 15 displaces the diaphragm 14 to produce compression or expansion of the gas volumes.

A pair of pressure sensitive transducers 18 and 19 are mounted (by means not shown) one within the gas cavity of the enclosure 13 and the other outside of the cavity within the gas filled portion of the container 10. The transducers 18 and 19 may comprise microphones of conventional design capable of producing an output signal proportional to a change in pressure. The deflection of the diaphragm 14 causes an incremental volume change and thus an incremental pressure change both within the reference cavity and within the container 10. The transducer 18 senses the pressure change within the reference cavity while the transducer 19 senses the relatively smaller pressure change within the larger gas volume of the container 10.

The enclosure 13 provides a small fixed volume $V_0$ acoustically separate from the main gas volume within the tank or container 10. However, the static gas pressure within the cavity of the enclosure 13 is maintained equal to the pressure in the container 10 by means of a small aperture 21 through the cavity wall.

Ideally, the aperture 21 should be of such small size as to prevent passage of the liquid into the cavity 13, but should also be of sufficient size to permit a gas flow rate capable of balancing any changes in static pressure within the system. Static pressure changes usually occur at fairly reduced rates thus permitting a close approximation of the ideal conditions for the aperture. This permits balancing of static gas pressures while maintaining acoustical isolation of the reference cavity from the remainder of the container.

When the diaphragm 14 of the speaker or other movable element of the drive transducer 12 is actuated by a current passing through the coil 15, it produces an incremental volume change, $-\Delta V$, in the reference cavity volume $V_0$ and a change of $+\Delta V$ in the empty portion of the tank volume $V_g$. The differential volume changes in turn produce corresponding pressure changes, $\Delta P_0$ in volume $V_0$ and $\Delta P_g$ in volume $V_g$ respectively. The changes in the volumes and pressure of the two gas spaces are adiabatic and may be expressed by the following relations:

$$\Delta P_0 = -P_0 \gamma \Delta V / V_0 \qquad (1)$$

$$\Delta P_g = P_g \gamma \Delta V / V_g \qquad (2)$$

In the above expressions $P_0$ and $P_g$ denote the static pressures and the symbol $\gamma$ represents the ratio of specific heats of the gas filling the tank. The ratio of specific heats is defined as being the ratio of the specific heat of a gas at constant pressure to the specific heat of a gas at constant volume.

Since the volumes $V_0$ and $V_g$ are interconnected by the leakage aperture 21 the values of the static pressures $P_0$ and $P_g$ in the above expressions are equal. Therefore, it can be seen that the acoustic pressures will be inversely proportional to the respective volumes as given by the equation:

$$\Delta P_g / \Delta P_0 = V_0 / V_g \qquad (3)$$

Since only the acoustic pressures $\Delta P_0$ and $\Delta P_g$ are measured by the pressure transducers 18 and 19, the electrical outputs $e_0$ and $e$ respectively from the transducers are inversely proportional to the respective volumes. The volume $V_0$ remains constant while the volume $V_g$ changes with the liquid level; therefore, the voltage output $e$ of the transducer 19 corresponds to the volume $V_g$ and is a function of the volume $V_g$. The liquid volume $V_1$ can then be readily determined from the relationship:

$$V_1 = V_c - V_g \qquad (4)$$

since the total volume $V_c$ of the tank is constant.

The above simple relations hold as long as the static pressures in $V_0$ and $V_g$ are the same, and the ratios $\gamma$ of the specific heats of gases in $V_0$ and $V_g$ are the same. Usually $\gamma$ is independent of temperature, so that the volumetric measurements will also be independent of temperature. Furthermore, if the gases within the two volumes are somewhat different but the value of $\gamma$ is the same for both gases, the measurement is independent of the gas mixtures. For example, the measurement is independent of the possible difference of partial pressures of the liquid vapor in the two volumes due to slow diffusion through the connecting aperture 21.

To measure the volume continuously the coil 15 on the drive transducer 12 may be actuated continuously during the period of measurement by alternating current. For accuracy the operating frequency should be such that the corresponding wave length (determined by dividing the velocity of sound in the tank by the frequency) is always considerably greater than the largest dimension of the tank, so that the acoustic pressure is essentially the same through the entire volume $V_g$.

In the arrangement of FIG. 1, two variable gain amplifiers 22 and 23, the gains of which are designated $A_0$ and $A$ respectively, are coupled to receive the voltage outputs from the transducers 18 and 19 respectively. However, the variable gain amplifier 22 receives only a portion, $me_0$, of the output voltage $e_0$ applied across the potentiometer 24. The proportionality factor, $m$, is determined by the setting of the tap on the potentiometer 24. The voltage output $e$ from the transducer 19 is amplified by the variable gain amplifier 23 to a level $eA$ and then clamped through a unidirectional diode 25 to an output terminal 26 and to the positive terminal of a D.C. voltage source 27. A small resistor 28 connects the negative terminal of the D.C. source 27 to ground reference potential.

The voltage amplitude $E_c$ of the source 27 is chosen arbitrarily to represent the total volume $V_c$ of the tank 10. Whenever the amplifier voltage $eA$ exceeds the value of $E_c$ of the source 27, current will flow in the forward direction through the unidirectional diode 25, the source 27 and the small resistor 28 to ground. This current flow produces a voltage across the small resistor 28 which is smoothed by action of the capacitor 29 and fed back to gain control elements within the variable gain amplifiers 22 and 23. As the current flow through diode 25 increases to achieve clamping, the gain control signal across the resistor 28 increases, thus decreasing the respective gains $A$ and $A_0$ of the variable gain amplifiers 23 and 22. An additional smoothing capacitor 31 may be connected across the D.C. source 27 for the purpose of smoothing the voltage appearing at the output terminal 26.

The voltage appearing at the output terminal 26 with reference to ground, may not be exactly equal to the voltage amplitude $E_c$ from the source 27 due to the small voltage which is developed for gain control across the resistor 28. Likewise, the amplifier output $eA$ may not be exactly equal to the voltage appearing on the output terminal 26 due to a small voltage that appears across diode 25 when it conducts. Therefore, it may be said that in a practical situation:

$$eA = \alpha E_c \qquad (5)$$

where $\alpha$ is a circuit constant equal to unity for a perfect diode limiter circuit. Though perfection is not attainable, the circuit elements may be so chosen so that the constant $\alpha$ approaches unity.

In many instances the transducers 18 and 19 are subjected to various vibratory and noise interferences which may have an adverse effect upon the volume measurement. In such instances it is desirable to use filtering circuitry responsive only to the frequency of the acoustic signal in order to exclude most of the interference. To this end the amplifiers 23 and 22 may be arranged to have narrow band-pass characteristics at the acoustic frequency of the speaker.

In order to achieve a high degree of amplifier frequency selectivity without the necessity of accurately tuning a separate oscillator, an arrangement for self-excitation through acoustic feedback may be provided. The output frequency from the variable gain amplifier 23 in FIG. 1 is connected through an A.C. coupling capacitor 32 to provide excitation power to the actuating coil 15 of the speaker. This arrangement results in the transducer 19 being coupled through the amplifier 23 to the drive transducer 12 so as to actuate the transducer 12 at a frequency already passed within the narrow band. The amplifier gain $A$ is greater than the acoustic loss from the drive transducer 12 to the pickup transducer 19; this maintains the oscillations under conditions of variable attenuation due to variations in the volume $V_g$ or other changes, such as static pressure $P$.

Since the diode limiter circuit at the output of the amplifier 23 maintains the output voltage $eA$ essentially constant and the gain is automatically adjusted through the automatic gain control arrangement, the value of the voltage output $e$ from the transducer 19 resulting from the voltage input $eA$ to the drive transducer 12 may be obtained from the equation:

$$e = (k/V_g) \cdot (eA) \qquad (6)$$

where $k$ is the acoustic coupling between the drive transducer 12 and the pickup transducer 19. In like manner, the value of the output voltage $e_0$ from the transducer 18 will be directly proportional to the acoustic coupling $k_0$ between the drive transducer 12 and the pickup transducer 18 and inversely proportional to the size of the reference volume $V_0$. Therefore, this relation might be given by the equation:

$$e_0 = (k_0/V_0) \cdot (eA) \qquad (7)$$

From Equations 6 and 7 it will be seen that the gain $A$ of amplifier 23 is given by either expression in the equation:

$$A = V_g/k = e_0/eV_0/k_0 \qquad (8)$$

The amplifier 22 is identical to the amplifier 23 and receives the same automatic gain control voltage from the resistor 28 thus making the gains $A$ and $A_0$ equal. The amplified signal ($m \cdot e_0 \cdot A_0$) from the variable gain amplifier 22 is then coupled through another unidirectional diode 34 to the other output terminal 35. The signal $E_g$ appearing on the output terminal 35 is developed across a load resistor 36 connected between the cathode of the diode 34 and ground. A smoothing capacitor 37 parallels the load resistor 36. From the previous equations and relations, it may be seen that:

$$\alpha E_g = m \cdot e_0 \cdot A_0 = m \cdot (k_0/V_0) \cdot (eA) \cdot A$$
$$= m \cdot (k_0/V_0) \cdot (\alpha E_c) \cdot (V_g/k) \qquad (9)$$

where the symbol $\alpha$ again stands for the circuit constant relating the voltage at the anode of the diode 34 to the output voltage appearing at the cathode and the output terminal 35.

The voltage reading $E_1$ appearing on the indicator of a voltmeter 38 connected between the output terminals 26 and 35 may be made proportional to the volume of liquid contained within the tank 10. For this result, the tap on the voltage divider 24 is adjusted so that the value of $m$ corresponds to:

$$m = (k/k_0) \cdot (V_0/V_c) \qquad (10)$$

The voltage amplitude $E_1$ indicated by the voltmeter 38 is given by the equation:

$$E_1 = E_c - E_g = E_c[l - m \cdot (k_0/k) \cdot (V_g/V_0)] \quad (11)$$

Thus, for any value of $V_g$ when $m$ is so adjusted, the final output voltage $E_1$ is obtained by combining the value of $m$ from Equations 10 and 11 to give the equation:

$$E_1 = E_c[l - (k/k_0) \cdot (V_0/V_c) \cdot (k_0/k) \cdot (V_g/V_0)]$$
$$= E_c(V_c - V_g)/V_c = E_c \cdot (V_1/V_c) \quad (12)$$

Therefore, it is seen that the final voltage output $E_1$ may be made directly proportional to the liquid volume $V_1$ by proper selection of the value of the proportionality factor $m$. The indicator scale on voltmeter 38 can then be marked to provide direct volume, instead of voltage readings.

It should now be mentioned that this arrangement provides a final voltage reading $E_1$ accurately proportional to liquid volume $V_1$ only when the two amplifiers 22 and 23 are carefully designed to give variable but equal gains over the input voltage range corresponding to the ratio of the total tank volume $V_c$ to the minimum ullage volume, normally, over the range of 20:1 to 100:1.

This method of measuring liquid volume is effective under all conditions of liquid and vapor or gas mixing, even with isolated pockets of gas present in the body of the liquid and even with the liquid segregated in many disconnected globules. Pockets of gas react to pressure changes in the same manner since the surrounding liquid offers little or no inertial resistance to compression or expansion of the pocket by the acoustic signal at a sufficiently low frequency of operation. Therefore, the control of the position of the liquid in the tank is not required, so long as transducers are selected which will withstand immersion in the liquid and retain adequate low frequency response. Additionally, this system is equally useful for making volume measurements of solids so long as the entire gas volume is acoustically connected in the tank.

A remaining consideration is that the operation frequency be lower than the lowest resonant frequency of the liquid-gas mixture, which is given approximately by the expression:

$$\omega = 4/L\sqrt{P\delta/\rho} \quad (13)$$

where L is the largest linear dimension of the tank, P is the pressure in the tank, $P.\delta$ is the gas compressibility, and $\rho$ is the liquid density. For a particularly large tank, the angular frequency $\omega$ may be as low as a few cycles per second so that the operating frequency is only a fraction of a cycle per second.

The acoustic transducer elements 12, 18 and 19 have herein been described and illustrated in conventional form and, in most cases, any conventional readily available acoustic speaker and microphone will suffice. However, certain distinct advantages are realized by employing transducer elements possessing selected characteristics.

The tank volume $V_c$ is in most cases quite large. For this reason, the drive transducer should produce rather large volume displacements so that the pressure changes produced in the large volume of air can be readily sensed by the microphone transducers. High compliance characteristics are also desirable to prevent undue consumption of power in producing the large volume displacements.

It should here be realized that the drive transducer arrangement has its own resonant frequency of mechanical oscillation as determined by various factors including the compliance of the diaphragm 14, the mass of the moving parts, and the pressure of the gas within the reference cavity and the tank 10. If the resonant frequency of the drive transducer arrangement is made equal to the frequency of the actuating signal, only relatively small amounts of power are required for its operation. Furthermore, when an acoustic feedback arrangement is employed for driving the transducer, the drive transducer with its own frequency is connected in the feedback path and therefore can affect the operating frequency. To illustrate, if the resonant mechanical frequency of the drive transducer 12 is somewhat higher than the center of the pass-band of the variable gain amplifier 23, the operating frequency of the entire acoustic feedback arrangement is shifted toward the higher frequency of the pass-band. Thus the entire acoustic feedback arrangement operates at neither the frequency resulting in greatest power transfer through the band-pass amplifier 23 nor at the frequency at which the drive transducer 12 can be driven most efficiently; the resulting frequency is a compromise resulting in undue power consumption in both components and more importantly in the necessity of broadening the pass-band of the amplifiers. In seeking maximum efficiency and minimum error due to interference, the natural frequency of the drive transducer 12 should be sustained near the center frequency of the pass-band of the amplifier 23. As the pass-band of the amplifier 23 is widened, more noise will be allowed to pass; it is then necessary to operate the drive transducer at greater acoustic powers to raise the signal-to-noise ratio to maintain system accuracy. Since the gas pressure is a major factor in determining the natural frequency of oscillation of the drive transducer, a single resonant frequency for conventional speakers cannot always be maintained. Large variations in pressure can occur within a system due to changes in temperature and pressure and variations in the liquid volume.

Referring now to FIGS. 6 and 7, there is shown a high compliance, low frequency drive transducer which has a mechanical resonant frequency almost totally independent of the pressure of the gas within the gas cavity volume $V_0$. A stationary base composed of a cylindrical metal body 111 closed at one end holds the magnetic field source 112 of the drive transducer rigidly in place. A cylindrical Sylphon bellows 113 firmly attaches a solid disc 114 to the rigid cylindrical body 111.

Sylphon is a trademark of Fulton-Sylphon Division of Robertshaw-Fulton Controls Co., 2400 Cumberland Avenue, Knoxville, Tennessee. The disc 114, the Sylphon bellows 113 and the rigid cylindrical body 111 define the reference gas cavity of the drive transducer. A conventional voice coil 115 is attached to the bottom of the solid disc plate 114 and located adjacent the poles of the magnetic field source 112, in conventional fashion, so that a flow of current through the coil displaces the disc 114 to produce oscillations. Large apertures 116 are provided to connect the volume of gas on one side of the magnetic field source 112 to that volume on the other side so that the gas in the two sections forms a single coherent gas volume.

When a speaker of this type is employed in a volumetric measuring system, the volume of gas $V_0$ is the reference in which one of the microphones for measuring pressure changes may be disposed. Actually, the space between the magnetic field source 112 and the closed end of the cylindrical metal body 111 need not be provided except where a relatively large reference volume $V_0$ is desired; however, the microphone is conveniently disposed in this otherwise empty space. As before, this volume of gas is acoustically isolated from the remainder of the system even though an acoustical isolating leakage aperture or pressure equalization connection to the tank may be provided. When electric current is supplied to the voice coil 115, the solid disc 114 is displaced to produce the incremental changes in volume and pressure utilized for the volumetric measurements.

On the other side of the solid disc 114, a mass 120 is suspended within a sealed, evacuated space by a bowed loop 121 of light spring steel attaching the mass to the solid disc 114. Loop 121 is fastened to disc 114 by any suitable means such as clamping block 122. The cover 123, which is cup-shaped, may have a circular flange portion 124 which allows it to be fastened tightly by any appropriate means, such as bolts 125 or welding joints, to the circular disc 114. If necessary, a circular gasket 126 can be placed between the flange and the disc to insure the maintenance of the low pressure under the cover 123. By this arrangement the mass 120 can oscillate independently within the cup-like space against the restraining action of the spring 121 without substantial damping by gas friction. Sideways movement of the mass 120 may be restrained by the action of restraining wires 127 coupling the mass 120 to the sides of the cover 123 or by any other appropriate means if deemed necessary. The restraining wires 127 possess sufficient elasticity to permit the desired movement of the mass 120 by the spring 121. Usually the loop shape of the spring 121 provides sufficient restraint to lateral movements by the mass 120.

The mechanical vibrational qualities of this transducer can best be explained by reference to the diagrammatic equivalent shown in FIG. 8. A mass $M_2$ is connected by a spring $K_2$ to the stationary reference surface 130. The mass $M_2$ is also coupled through a second spring $K_1$ to another mass $M_1$. The mass $M_2$ represents the total mass of the solid disc 114, the attached coil 115, the cover 123 and any other mass which may be attached thereto. The spring constant $K_2$ represents the combined spring action of the Sylphon bellows 113 and the gas pressure within the volume $V_0$. Normally, these are the only two constants which determine the resonant frequency of a speaker; therefore, changes in gas pressure of the volume $V_0$ can substantially change the spring constant $K_2$ and thus the resonant frequency of the speaker.

However, to prevent this, the $M_1$ and $K_1$ quantities may be added. The mass $M_1$ represents the additional mass 120 and the spring constant $K_1$ represents the combined spring action of the restraining wires 127 and the compression spring 121. By a proper choice of the value for $K_1$, the resonant frequency of the combined system can be made substantially independent of variations in the value of $K_2$ caused by pressure changes in the gas. To accomplish this result, the spring constant $K_1$ should be very much smaller than the spring constant $K_2$. The result is best accomplished by using very flexible springs and restraining wires with a high elasticity. Thus, there may be provided a drive transducer having high compliance, large displacement characteristics and a substantially constant resonant frequency independent of the gas pressure in the volume $V_0$ without substantially increasing the weight of the drive transducer.

An insight into the operation of the device may be gained from making a mathematical analysis of the mechanical system. In the interest of brevity, a complete mathematical derivation is not included herein; however, the results of such analysis can be given by the equation:

$$\omega_0^2 = \omega_1^2 \left[ 1 - \frac{\left(\frac{M_1 + M_2}{M_2}\right)^2}{\left(\frac{\omega_2}{\omega_1}\right)^2} \right] \quad (14)$$

where $\omega_0$ is the resonant frequency of the combined system, $\omega_1$ is the natural resonant frequency of $M_1$ and $K_1$ acting as an independent mechanical system, and $\omega_2$ is the natural resonant frequency of $M_2$ and $K_2$ also acting as an independent mechanical system. Since the independent resonant frequencies $\omega_1$ and $\omega_2$ are given by the equations:

$$\omega_1^2 = K_1/M_1 \quad (15)$$
$$\omega_2^2 = K_2/M_2 \quad (16)$$

it is seen that the value of $\omega_0$ from Equation 14 approaches the value of $\omega_1$ when $\omega_1$ is made much smaller than $\omega_2$ by making $K_1$ much smaller than $K_2$.

Further analysis or observation shows that the mass $M_1$ of the drive transducer has an oscillatory movement many times greater than the oscillatory movement of the mass $M_2$ during each cycle. Thus, most of the energy supplied to the drive transducer is stored in the greater oscillatory movement of the element $M_1$.

Referring now to FIGS. 9 and 10 more compact versions of drive transducers employing the same basic principle as illustrated in FIGS. 6 and 7 may be utilized. In FIG. 9, a cylindrical body 131 may be mounted upon the tank surface 10 by means of the weld joints 132 or any other appropriate means. The upper portion (as illustrated in FIG. 9) of the body 131 is closed while the lower portion is partially closed by an annular shaped interior extension 133 slightly recessed from the lower end of the cylinder. A cylindrical enclosure 134 defines the evacuated space in which a mass 135 is suspended between two elongated bow-type, thin steel springs 136 and 137. The elongated bow spring arrangement both above and below the mass 135 provides increased stabilization militating against lateral movement of the mass 135. A Sylphon bellows 138 supports the evacuated cylindrical enclosure 134 almost wholly within the body 131 of the drive transducer. The Sylphon bellows 138 is sealed to the aperture opening in the annular extension 133 and is also sealed at its other end to the flange 139 provided at the top of the container 134. The top of the enclosure 134 supports cylindrical winding core 141 carrying the actuating coil 142 between the poles of a field source 143 in conventional fashion. The restraining wires 144 and 145 are attached from the sides of the body 131 to short extensions on the top and bottom of the sealed container 134 to prevent any lateral oscillations during operation.

In operation the coil 142 receives alternating current to move the sealed container 134 in vertical oscillations against the action of the bellows 138 to produce the desired expansions and compressions. As before the frequency is stabilized by oscillations of the mass 135 within the sealed container 134.

The body 131 of the drive transducer is further provided with a small concave depression 146 wherein a pressure sensitive transducer 147 may be mounted to sense pressure changes within the tank 10. Another pressure sensitive transducer 148 is mounted within the reference cavity defined by the body 131, the bellows 138, and the evacuated container 139. Protective screens 149 and 151 may be provided across the bottom of the body 131 and the concave portion 146 respectively to prevent any injury to the elements contained therein. All of the elements for a volumetric measuring system are thereby contained in a unitary cylindrical package which may easily be attached as a unit within a tank to measure the volume of a noncompressible material.

In FIG. 10 a similar drive transducer arrangement is shown also containing the pickup transducer 153 and 154. An evacuated enclosure 155 containing an additional mass 156 is supported as in the previous embodiment, within the body 160 of the drive transducer. The mass 156 within the evacuated space is supported in this case by four V-shaped bent steel springs, two springs 158 and 159 on the bottom and two springs 161 and 162 on the top. The pairs of V-shaped springs have their pointed portions toward one another to provide a broader support base than attained with the bow springs to prevent lateral movement of the mass 156; the result is enhanced by the fact that the attachment points of the springs are more widely separated.

The actuating coil and field source of the previous embodiments are in this case replaced by a piezoelectric actuating arrangement. A crystal 164 with upper and lower electrodes is rigidly supported on one side by the upper interior surface of the body 160 and insulated from it if necessary. The piezoelectric crystal 164 is held tightly between a base plate 166 and the top of the body 160 by an adhesive binder and also by the upward spring action of the Sylphon bellows 157 and an additional spring arrangement 163. When an actuating voltage is applied from input terminals 167 and 168 to the crystal arrangement, the crystal 164 expands or compresses along its vertical axis to move the base plate 166. The spring arrangement 163 amplifies the relatively small movement of the base plate 166 into the desired larger oscillations. This permits a more compact arrangement than in previous embodiments due to elimination of the coil and field source.

Figure 2:
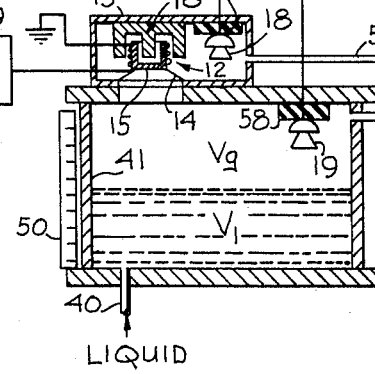
FIG. 2 represents an embodiment of the invention wherein vibration and noise effects are limited by filters and an accurate calibration may be obtained.

In FIG. 2, a simplified embodiment of the invention is shown which omits the automatic calculating features employed in the embodiment of FIG. 1. The container 41 contains an appropriate tubing 40 for admitting amounts of liquid for purposes of calibration. The drive transducer 12 and cavity enclosure 13 may be mounted on one of the walls outside of the tank volume if desired along with the transducer 19 which is in contact with the volume within the tank. The reference cavity transducer 18 is mounted upon the cavity enclosure 13. The output from the transducer 18 is passed by a band-pass filter 42 and applied to the fixed gain amplifier 43 with the connected voltmeter 44 indicating the value of the amplified voltage. Likewise, the output from the transducer 19 is also passed through a similar band-pass filter 45, amplified by the fixed gain amplifier 46, and the amplified voltage is indicated by a voltmeter 47 connected to the output of the amplifier 46. Oscillations from a separate oscillator 48, which are suitably amplified by the amplifier 49, actuate the drive transducer 12. The center of the frequency band passed by the filters 42 and 45 corresponds to the frequency produced by the oscillator 48.

Figure 3:
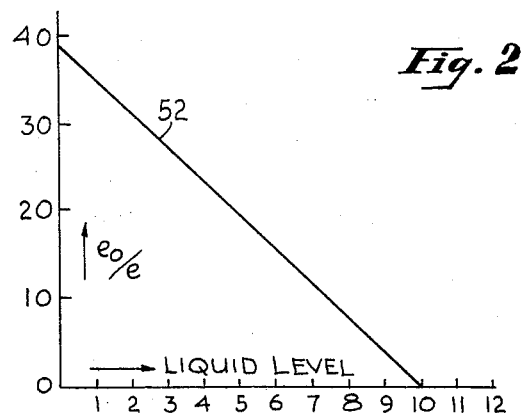
FIG. 3 is a graphical illustration of the response of the embodiment of FIG. 2 during calibration.

The system may be calibrated by placing alongside the tank a vertical scale 50 for measuring the level of the stored material within the tank 41. The tank may be constructed of a transparent material or be provided with a transparent window therein to allow comparison of the stored material level with the readings on the scale 50. Controlled amounts of material are then admitted through the tubing 40 and various simultaneous readings are made of the voltmeters 44 and 47 and the level inside the tank 41 to obtain the necessary data for the calibration chart shown in FIG. 3. The results of the calibration produce an essentially straight line graph 52 when the tank is cylindrical, as shown. After a calibration has been made of a complete system including drive and sensing transducers, filters, amplifiers, oscillators and meters, the various components can be installed as a unit within a tank of like dimensions and the calibration chart used thereafter to determine the stored material level from the meter readings. By using this simple calibration technique, the accuracy of the volume determinations is made independent of a close matching of the electronic components. Such a simple system might prove useful in measuring volumes contained in storage facilities where more expensive systems are not justified.

With the enclosure 13 of the reference cavity mounted outside of the tank in this system, a connecting tubing 51 may be provided to connect the tank with the reference cavity for equalizing the static gas pressures within the two volumes. A simple connecting tube of small bore will in most cases be sufficient for this purpose. However, for increased accuracy under some circumstances, it may be desirable to provide a tubing having acoustical filter and vapor trapping properties, such as those illustrated in FIGS. 11, 12, 13 and 14.

Referring now to FIGS. 11, 12 and 13, the large diameter tube 53 is divided by washer elements 54 into closed sections. These sections are coupled to one another by smaller diameter lengths of tubing 55 which extend through the washer elements 53 and overlap for a portion of their lengths within each closed section. The alternate large and small diameter acoustic paths through the combined tubing produces the acoustical filter action and in addition acts to prevent the passage of liquid therethrough. The overlapping design is advantageous in producing increased acoustical filtering and liquid collection for a given length of tube.

The design of this acoustical filter tubing permits the construction of an acoustical filter of any desired length with increased ease. This is best illustrated by reference with the exploded view of FIG. 13. The small diameter tubes 55 may be inserted within the circular holes within the washer and an adhesive used to retain the washer at 54 at the proper location. The small diameter tubes 55 are then arranged in their overlapping position and an adhesive used between the points of overlap to attach the different sections of tubing into a chain of the desired acoustical filter length. The connected chain can then be inserted into the larger diameter tubing 53 to form the acoustical filter. Each of the elements of the filter may be made of flexible polyethylene material or of more rigid materials if desired. Although the washers 54 do not produce a completely air tight closure between the different sections unless sealed to the interior wall of the large tube 53, the resulting enclosure is sufficient for most applications without the use of sealing adhesives. With this design, acoustical filter sections may be removed or added where necessary to improve either gas dispersion and pressure equalization between the volumes or acoustical and liquid isolation respectively.

In FIG. 14, a simplified acoustical filter tubing is shown in which no overlap of the smaller diameter tubing 55 is provided. This type of tubing allows greater amounts of fluid to be trapped therein without interfering with the passage of the gas through the tubes. However, each washer 54 and tube section 55 are inserted individually and spaced within the large tubing 53.

As previously mentioned, the pressure sensing transducers 18 and 19 can consist of a conventional microphone of the piezoelectric or other type disposed to receive the acoustic pressure changes. However, to prevent any alternations in the response of these microphones due to liquid vapor, the microphone may be coated with a liquid proofing lacquer or plastic material. However, only the affected elements should be covered since sealing of the entire microphone causes changes in response with static pressure changes. Where the material is corrosive, the microphone may be of a single piezoelectric crystal with silver contacts on each end covered by an appropriate protective coating.

Where vibrational environments are encountered, the microphones 18 and 19 may be isolated from the vibrational disturbances by attaching them to mounts 57 and 58 respectively, FIG. 2, which may be of foam rubber or any other soft resilient material. A pad of foam rubber can be attached to the walls and the microphones simply by using an adhesive material.

Adverse effects on accuracy from vibration and noise at frequencies different from the operating frequency are dependent upon the characteristics of the band-pass filters or amplifiers, so that the noise suppression is directly proportional to the filter selectivity. By using narrow band circuits at each stage of the amplifier, most of this interference can be suppressed. However, interference effects occurring at frequencies within the pass-band produce spurious transducer outputs due to "microphonic" effects, that is, outputs caused by vibration and due to acoustic noise.

Figure 4:
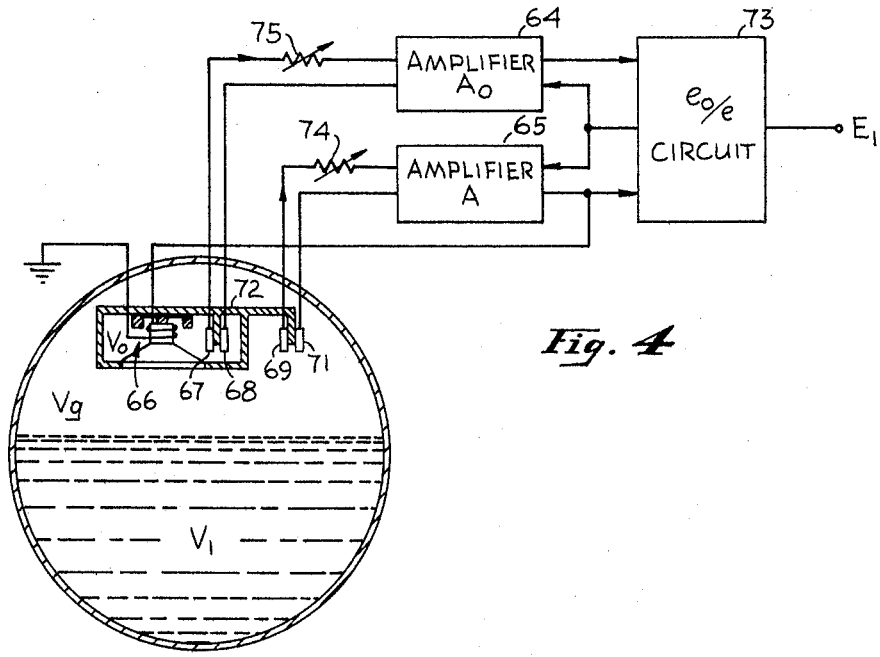
FIG. 4 is a diagrammatic illustration of a further embodiment of the invention in which vibratory and noise effects are minimized.

Referring now to FIG. 4, an arrangement is shown for discriminating against vibration effects that may occur within the pass-band and thus cannot be removed by filtering techniques. As before, highly selective band-pass amplifiers 64 and 65 are provided for amplifying the outputs received from the two pickup transducer locations and the output of one of the amplifiers 65 is connected in an acoustic feedback arrangement for providing excitation of a drive transducer 66. Two pairs of pickup transducers 67, 68 and 69, 71 are provided instead of the normal single transducer at each of the pickup locations. The transducers may comprise pairs of individual microphones which are rigidly attached back-to-back and mounted on a common, vibration suppressing support 72. The transducer voltage outputs due to the acoustic pressures are in-phase, while their outputs due to a vibration in the most sensitive direction (the common axis of the two microphones) are 180° out-of-phase. Adjustable resistors 75 and 74 are placed in series circuit with the output from one of the transducers of each pair. By matching the two outputs of the pair with the respective adjustable resistor and then combining the outputs, the output from an amplifier due to vibration can be reduced very substantially. By this method, vibration interference effects can be made sufficiently small so that volume measurements will be useful and accurate even under the most severe vibration environment.

The $e_0/e$ circuit 73 may be any convenient calculation circuitry, such as that explained in connection with the embodiment of FIG. 1, for obtaining a voltage output proportional to the volume of liquid within the container and (if desired) an automatic gain control signal for the amplifiers 64 and 65.

The acoustic or vibration excitation at the speaker diaphragm due to interference at the operating frequency produces the same effect as the desired excitation, so that even though the pickup transducer output voltages fluctuate with the intensity of the interference, their voltage ratio will remain the same. This is one reason why a pickup transducer is placed within the reference cavity volume $V_0$. Another reason for the use of a reference volume is to neutralize the effects of a variation of the acoustic output of the drive transducer resulting from changes in tank gas volume or changes in static pressure or other gas characteristics. The actual output of a microphone is dependent upon many factors; but, by using the ratio of the voltages to produce the volume indication, an accurate volume measurement can be obtained as long as the electric and electroacoustic components are constant in their characteristics and the ratio of specific heats of the gas in the two volumes remains the same.

Figure 5:
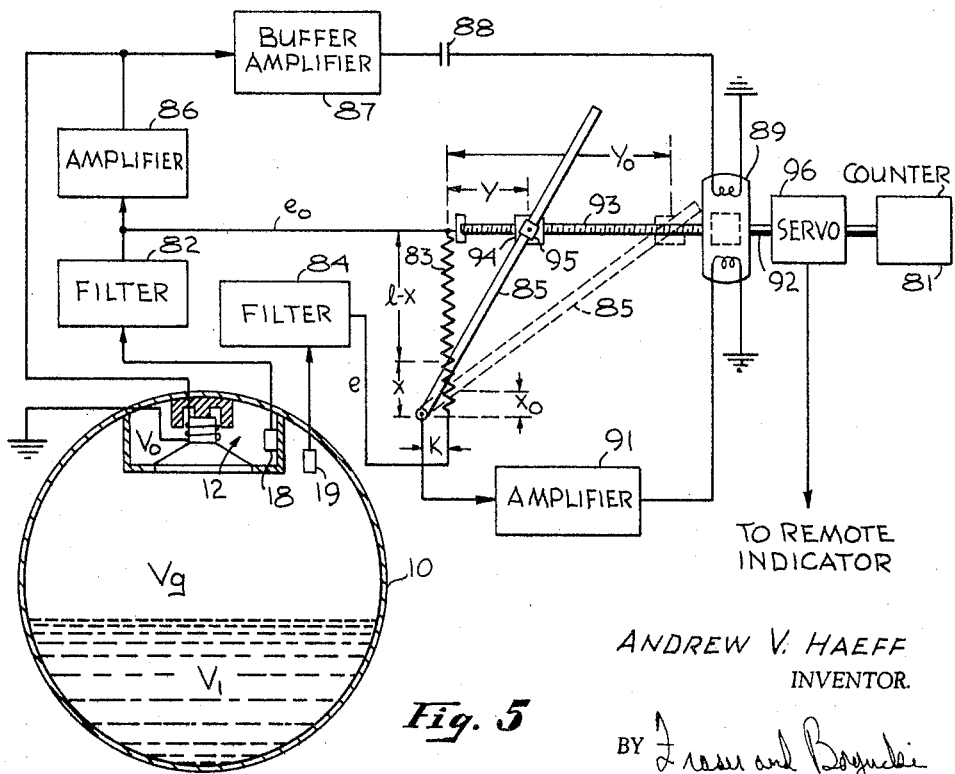
FIG. 5 is a diagrammatic illustration of another embodiment of the invention in which the volume is indicated by means of a servo system.

In the arrangement shown in FIG. 5, a simple electromechanical device is used to convert microphone voltage ratios into a digital reading on a revolution counter 81. This arrangement has the advantage of completely avoiding inaccuracies due to the instability of active electronic components, and, furthermore, gives greater accuracy by direct conversion into a digital or servo signal indication which can be remotely displayed. The drive transducer 12 and the two pickup transducers 18 and 19 are arranged within the tank 10 as in the embodiment of FIG. 1 with the drive transducer 12 being actuated by the previously explained acoustic feedback connection. The voltage output from the pickup transducer 18 is passed through the filter 82 for removal of interference effects and then applied to one end of a resistance element 83. The filtered output $e$ from the pickup transducer 19 is applied through a filter 84 to the opposite end of the resistance element 83. A contact arm 85 pivotally mounted at one end makes contact with the resistor at specific points along its length $l$ depending upon the angle at which it is held.

The filtered output $e_0$ from the transducer 18 is also increased in magnitude by the amplifier 86. The amplified signal is then applied through a buffer amplifier 87 and a phase shifting capacitor 88 to one winding of a two-phase motor 89. The phase shifting action of the buffer amplifier 87 combined with that of the coupling capacitor 88 should be such as to produce a 90° overall phase shift to the signal for the operation of the two-phase motor 89.

The voltage applied to the contact arm 85 from the resistance element 83 is applied through another amplifier 91 to a second winding of the motor 89. Thus, the two-phase motor 89 rotates only when alternating currents exist on both of the phase windings. The direction of rotation depends upon the phase of the alternating current signal applied to the contact arm 85. Alternating voltages $e$ and $e_0$ are 180° out-of-phase, thereby producing a null point somewhere along the length $l$ of the resistance element 83. When the contact arm 85 is at the null point, the second winding receives no signal and the servo motor 89 is at rest. The position of the null point $x$ depends upon the voltage ratio $e_0/e$ and, therefore, upon the volume ratio $V_g/V_0$ according to the following equation:

$$(l-x)/x = e_0/e = V_g/V_0 \qquad (17)$$

The rotor of the motor 89 is coupled to rotate a lead screw 93, which in turn drives a threaded carriage 94 in a direction depending upon the direction of rotation and parallel to the longitudinal axis of the screw 93. A rotatable cylinder 95 is pivoted upon the threaded carriage 94 to provide a second pivot point for the contact arm 85 through which it can freely slide as the carriage moves back and forth along the lead screw 93. Thus, in operation, if the contact arm 85 is not already at the null point, a signal is delivered through the amplifier 91 to actuate the motor 89, thereby rotating the lead screw 93 in a direction to bring the contact arm 85 towards the null point. At the null point, $x$, on the resistor 83, the carriage 94 will be at position $y$ along the lead screw 93. In this position the system is stabilized and no signal is delivered through the amplifier 91 to the second winding of the motor 89 and the motor stops; the existing relation is as follows:

$$y = K \cdot (l-x)/x \qquad (18)$$

where K is the distance at which the pivotal point of the contact arm is placed from the axis of the divider resistor 83. When the tank 10 is empty the carriage 94 will assume an initial position $y_0$ on the lead screw 93. At this initial position $y_0$, the following relation will obtain:

$$y_0 = K \cdot (V_c/V_0) \qquad (19)$$

knowing these relations, the liquid volume can now be obtained from the distance $(y_0 - y)$; this is illustrated by the equation:

$$(y_0 - y) = K \cdot (V_c/V_0) - K(l-x)/x$$
$$= K/V_0 \cdot (V_c - V_g) = (K/V_0) \cdot V_1 \qquad (20)$$

It should also here be noted that the output of the amplifier 86 is connected back to actuate the drive transducer 12 as in the previous embodiments. As before the amplifier 86 has sufficient gain to overcome any acoustic loss between the transducer 12 and the microphone 18 thus providing self oscillations at the pass-band frequency of the filters 82 and 84.

Also mechanically coupled to the rotation of the rotor of the motor 89 are a servo transmitter 96 and a revolution counter 81. The outputs from the servo transmitter 96 can be used in conventional fashion to position an indicator in a remote location. The revolution counter 81 is well known in the art and simply provides a first digital pulse output for each revolution occurring in one direction and a different digital pulse output for each revolution in the other direction. The digital pulses may also be transmitted to remote locations, if desired, to provide a direct digital indication of the volume of the liquid.

From the foregoing it may be seen that an accurate volumetric measuring system has been provided which is effective under all conditions of acceleration including zero-gravity and zero-acceleration environments. The devices herein disclosed are also capable of performing accurate volumetric measurements of a mass, whether liquid or solid, where it has assumed complex geometric proportions. Furthermore, with suitable design of electroacoustic components and operation at reasonably high acoustic powers, these devices are suitable and accurate for use under conditions of high acoustic and vibration noise. Although the invention is of primary value in moving vehicles such as ships, aircraft, and missiles, it will also provide a low cost and accurate means for measuring volumes in a wide variety of other environments, such as stationary underground gas storage tanks, grain elevators, enclosed coal bins, or the like.

Although particular volumetric measurement devices have been described above by way of example to illustrate the nature of the invention, it will be appreciated that the invention is not limited thereto. Accordingly, any and all modifications, alterations and equivalent arrangements falling within the scope of the following claims should be considered to be a part of the invention.

What is claimed is:

1. A system for measuring the volume of a non-compressible material within a confined space comprising a reference cavity, an acoustic filter connecting said space and said cavity for equalizing the static pressures within said space and said cavity while maintaining acoustic separation thereof, a drive transducer having a movable element between the cavity and the space, means for actuating the drive transducer to displace the movable element to produce incremental changes in dynamic gas pressure both within the space and within the gas cavity, a pair of pickup transducers for measuring both incremental pressure changes, and means for comparing the incremental pressure changes to provide an output indication of the volume of the non-compressible material in the space.

2. A system for measuring a volume of liquid comprising an enclosed container defining a first space in which liquid is held, a gas filled enclosure of known volume defining a second space, an acoustic filter connecting said first space and said second space for equalizing the static pressures within said first space and said second space while maintaining acoustic separation thereof, means for causing equal incremental volume changes in said first and second spaces, pressure sensing means disposed in each space for measuring dynamic gas pressure changes due to the incremental volume changes and for producing output signals indicative of said changes, and means coupled to the pressure sensing means for combining the output signals in order to indicate the liquid volume in the container.

3. Apparatus for measuring the liquid volume within a container comprising: a reference cavity, a drive transducer having a movable element mounted between said reference cavity and said container, means providing an aperture for equalizing the static pressure within the gas cavity and the container, means for actuating the movable element of the drive transducer to produce volume displacements both within the cavity and within the container, a pair of pressure sensitive means located respectively within the gas cavity and within the container for measuring pressure changes due to the volume displacements, and means for comparing the pressure changes measured to provide an output indicative of the liquid volume within the container.

4. In a system for measuring the volume of a substantially non-compressible material within a container, the combination comprising drive transducer means having a gas reference cavity and being disposed adjacent the container for producing volume displacements at a predetermined frequency within the container, an acoustic filter connecting said container and said cavity for equalizing the static pressures within said container and said cavity while maintaining acoustic separation thereof, first pressure sensitive means located within the cavity of the drive transducer means for measuring pressure changes and producing a first output signal, second pressure sensitive means for measuring pressure changes occurring in the container and producing a second output signal, rigid mounting means holding both the first and second pressure sensitive means and subjecting both to the same vibratory movements, filter means connected to the output of the first and second pressure sensitive means to exclude all signals therefrom other than those occurring at a predetermined frequency produced by the drive transducer means, and means for comparing the filtered output signals to produce an indication of the volume of the container occupied by the substantially non-compressible material.

5. A storage arrangement comprising an enclosure including a first space having a predetermined gas volume and a second space for containing a substantially non-compressible material to be stored and a volume of gas, an acoustic filter connecting said first space and said second space for equalizing the static pressures within said first space and said second space while maintaining acoustic separation thereof, means for producing complementary compressions and expansions in said first and second spaces, and means for measuring and comparing the effect of the compressions and expansions in the first and second spaces to determine the volume of the substantially non-compressible material contained therein.

6. A volumetric measuring system for measuring the volume of materials having an indefinite shape comprising a first gas filled enclosed chamber containing the material, a second gas filled enclosed chamber having a known gas volume, the gas being the same and having the same static pressure in both chambers, leakage aperture means interconnecting said both chambers adapted to maintain said same static pressure while providing acoustical isolation therebetween, a deformable separation means for substantially dividing the gas in one chamber from that in the other chamber, means for momentarily deforming the separation means to produce equal and opposite volume changes in the first and second chambers, and means for comparing pressure effects in each of said first and second chambers caused by the momentary volume change to determine the volume of the material within the first chamber.

7. A system for measuring the liquid volume in a confined space comprising an acoustic drive transducer having a gas reference cavity therein, the acoustic drive transducer being located to produce acoustic signals within the space, an acoustic filter connecting said space and said cavity for equalizing the static pressures within said space and said cavity while maintaining acoustic separation thereof, a pair of microphone means for generating output signals proportional to pressure changes, one of the microphone means being located within the gas cavity and the other within the confined space, a pair of voltage controlled variable gain amplifiers separately coupled to respective ones of said microphone means for amplifying the output signals from the microphones, each of the amplifiers including a gain control element, means for generating a gain control voltage for maintaining the amplified output of the microphone located within the confined space at a predetermined voltage level proportional to the entire volume of the confined space, said means for producing a gain control voltage being connected to the gain control elements of both of said pair of amplifiers to provide each with an equal gain, the difference in voltage between the output voltages of the two amplifiers being proportional to the volume of the liquid within the confined space, and feedback means connecting the output of one of the amplifiers to the drive transducer for actuating the drive transducer.

8. A system for measuring the liquid volume in a confined space comprising drive transducer having a gas reference cavity therein, the drive transducer being located to produce acoustic signals within the confined space, means for maintaining the same static gas pressure within the gas cavity and the remainder of the confined space, a pair of microphone means for generating output signals proportional to pressure changes, one of the microphone means being located within the gas cavity and the other disposed within the confined space, a voltage divider circuit having a movable tap, the output signals from the pair of microphone means being connected to opposite ends of the voltage divider circuit to produce a null point, motor means operatively responsive to a voltage signal occurring at the movable tap to move it to the position of the null point, and indicator means responsive to the movement of the tap by the motor for indicating the liquid volume within the confined space.

9. A system for measuring the liquid volume within a space comprising an acoustic speaker means having a gas reference cavity, the acoustic speaker being located to produce acoustic signals within the space, an acoustic filter connecting said space and said cavity for equalizing the static pressures within said space and said cavity while maintaining acoustic separation thereof, a pair of microphone means for measuring incremental dynamic pressure changes both within the space and within the gas cavity, amplifier means including narrow band-pass filter means tuned to a predetermined acoustic frequency, said amplifier means being coupled to receive electrical signals from said microphone means and to deliver the electrical signals amplified to actuate the acoustic speaker at the predetermined frequency, and means for comparing the measurements of the incremental pressure changes from the microphone means to provide an output signal indicative of the liquid volume in the space.

10. A system for measuring a volume of liquid within a container defining a first space in which a liquid is stored comprising a gas filled enclosure of known volume defining a second space, an acoustic filter connecting said first space and said second space for equalizing the static pressures within said first space and said second space while maintaining acoustic separation thereof, means for causing equal incremental volume changes in the first and second spaces, pressure sensing means disposed in each space for measuring the dynamic gas pressure changes due to the incremental volume changes and for producing electrical signals indicative of said changes, each of said pressure sensing means including a pair of directional microphones disposed within the respective spaces to sense pressure changes in opposite directions, signal attenuating means connected to one of the microphones of each pair to provide equal output voltages from both microphones of the pair, means coupled to the pressure sensitive means for combining the output signals of each pair of microphones to produce cancellation of the portions of the output signals due to acoustic and vibration noises, and means coupled to the pressure sensing means for indicating the response of the pressure sensing means to the incremental volume changes.

11. A system for measuring liquid volume within a container comprising: a reference cavity, a drive transducer mounted between said reference cavity and said container, an acoustic filter connecting the reference cavity to the container for equalizing the static pressures within the gas cavity and the container while maintaining acoustic separation thereof, means for actuating the drive transducer to produce an acoustic pressure change both within the cavity and within the container, a pair of pressure sensitive means, one being located within the gas cavity and the other within the container for measuring the pressure changes occurring therein, and means for indicating the pressure changes measured so that the liquid volume within the container may be ascertained.

12. A system for measuring the liquid volume within a space comprising a drive transducer having a gas reference cavity therein and being located to produce acoustic signals within the space, an acoustic filter connecting said space and said cavity for equalizing the static pressures within said space and said cavity while maintaining acoustic separation thereof, said drive transducer including a first movable mass in contact with an acoustic medium within the space, a base support, first spring means having a first spring constant for coupling said first movable mass to said base support, a second movable mass, and second spring means having a second spring constant coupling said second movable mass to said first movable mass, said first movable mass having means for isolating said second movable mass from the acoustic medium within the space, the ratio of said second movable mass to said second spring constant being many times larger than the ratio of said first movable mass to said first spring constant; a pair of microphone means for measuring incremental pressure changes both within the space and within the gas cavity; amplifier means including narrow band-pass filter means tuned to a predetermined acoustic frequency equal to the natural mechanical frequency of the drive transducer, said amplifier means being coupled to receive electrical signals from said microphone means and to deliver amplified electrical signals to actuate the drive transducer at the predetermined frequency; and means for comparing the measurements of the incremental pressure changes from the microphone means to provide an output signal indicative of the liquid volume in the space.

13. A system for measuring liquid volume within a container comprising: a reference cavity, a drive transducer mounted between said reference cavity and said container, an acoustic filter device connecting the reference cavity to the container for equalizing the static pressures within the gas cavity and the container while maintaining acoustic separation thereof, said acoustical filter including an external tube having a relatively large internal cross section connected to provide a passage between the gas cavity and the container, a plurality of solid partition means inserted at intervals along the length of the external tube to form separate acoustical sections, each partition means having a cross section corresponding to the internal cross section of the external tube and having an aperture therein, and a plurality of small tube sections each having an external diameter to fit said apertures and a small internal cross section, said small diameter tube sections being inserted within the apertures to join adjacent acoustical sections in the external tube, means for actuating the drive transducer to produce a volume change both within the cavity and within the container, a pair of pressure sensitive means, one being located within the gas cavity and the other within the container for measuring the pressure changes occurring therein due to the volume change, and means for indicating the pressure changes measured so that the liquid volume within the container may be ascertained.

14. An acoustical drive transducer comprising a first movable mass for producing acoustical waves in an acoustic medium, a base support means, first spring means, having a first spring constant coupling said first movable mass to said base support means, a second movable mass approximately equal in mass to said first movable mass, and a second spring means having a second spring constant substantially smaller than said first spring constant coupling said second movable mass to said first movable mass, said first movable mass including means for isolating said second movable mass from the acoustic medium the ratio of said second movable mass to said second spring constant being much larger than the ratio of said first movable mass to said first spring constant.

15. A system for measuring the volume of a substantially noncompressible material comprising an acoustical enclosure for containing the substantially noncompressible material, a volume of gas filling the remainder of the acoustical enclosure, a gas-filled reference enclosure, an acoustic filter connecting said acoustical enclosure and said reference enclosure for equalizing the static pressures within said acoustical enclosure and said reference enclosure while maintaining acoustic separation thereof, means for producing incremental volume changes in the acoustical enclosure and the reference enclosure, pressure sensing means for generating electrical signals proportional to pressure changes in the volume of gas due to the incremental volume changes, pressure sensing means for generating electrical signals proportional to pressure changes in the reference enclosure due to the incremental volume changes, and indicating means responsive to the electrical signals for comparing the magnitude of the pressure changes, whereby the volume of the substantially noncompressible material may be determined.

References Cited by the Examiner

UNITED STATES PATENTS

| | | | |
|---|---|---|---|
| 1,590,369 | 6/1926 | Hahemann et al. | 340—8 |
| 1,604,693 | 10/1926 | Hecht et al. | 340—8 |
| 2,161,510 | 6/1939 | Fischel | 73—290 |
| 2,285,151 | 6/1942 | Firestone | 73—149 |
| 2,666,326 | 1/1954 | Poole et al. | 73—149 |
| 2,691,304 | 10/1954 | Smith et al. | 73—290 |
| 2,849,881 | 9/1958 | Anderson | 73—149 |
| 2,903,673 | 9/1959 | Harris | 340—8 |
| 2,993,559 | 7/1961 | Everett | 181—57 X |
| 3,075,382 | 1/1963 | Mathias | 73—149 |
| 3,080,939 | 3/1963 | Kelly | 181—57 X |

FOREIGN PATENTS 525,948  6/1921  France.

RICHARD C. QUEISSER, *Primary Examiner.*

E. F. KARLSEN, L. R. FRANKLIN,
    *Assistant Examiners.*